(12) United States Patent
Shin et al.

(10) Patent No.: US 8,374,149 B2
(45) Date of Patent: Feb. 12, 2013

(54) METHOD OF CONTROLLING HMIPV6 NETWORK-BASED HANDOVER, AND ACCESS ROUTER AND MOBILE NODE THEREFOR

(75) Inventors: Dong-Ryeol Shin, Gunpo-si (KR); Dong-Guen Kim, Yongin-si (KR); Sang-Min Lee, Suwon-si (KR); Yoe-Jin Yoon, Gongju-si (KR); Seung-Hyun Lee, Seoul (KR); Kee-Hyun Choi, Suwon-si (KR); Gun-Ha Lee, Samcheok-si (KR); Jong-Wan Yoon, Daegu (KR); Choon-Sung Nam, Seoul (KR); Hee-Jin Jeong, Suwon-si (KR); Ho-Jin Shin, Suwon-si (KR); Sang-Hwan Ryu, Uiwang-si (KR)

(73) Assignee: Sungkyunkwan University Foundation for Corporate Collaboration, Suwon-si (KR)

( * ) Notice: Subject to any disclaimer, the term of this patent is extended or adjusted under 35 U.S.C. 154(b) by 672 days.

(21) Appl. No.: 12/362,617

(22) Filed: Jan. 30, 2009

(65) Prior Publication Data
US 2010/0040017 A1 Feb. 18, 2010

(30) Foreign Application Priority Data
Aug. 14, 2008 (KR) ........................ 10-2008-0079887

(51) Int. Cl.
*H04W 4/00* (2009.01)
(52) U.S. Cl. ......... 370/331; 455/436; 370/338; 370/328
(58) Field of Classification Search .................. 455/436; 370/338, 328, 331
See application file for complete search history.

(56) References Cited

U.S. PATENT DOCUMENTS

| 2006/0029020 A1* | 2/2006 | Jung et al. ...................... 370/331 |
| 2006/0198370 A1* | 9/2006 | Haddad et al. ................. 370/389 |
| 2007/0008906 A1* | 1/2007 | Han et al. ...................... 370/254 |
| 2007/0275726 A1* | 11/2007 | Lee et al. ....................... 455/436 |
| 2008/0019318 A1* | 1/2008 | Akram et al. .................. 370/331 |

FOREIGN PATENT DOCUMENTS

| JP | 2003051840 | 2/2003 |
| JP | 2003051841 | 2/2003 |
| JP | 2005167388 | 6/2005 |
| KR | 1020060128638 | 12/2006 |

* cited by examiner

*Primary Examiner* — Patrick N. Edouard
*Assistant Examiner* — Michael Irace
(74) *Attorney, Agent, or Firm* — Lexyoume IP Meister, PLLC.

(57) ABSTRACT

Disclosed herein are a method of controlling Hierarchical Mobile IPv6 (HMIPv6) network-based handover and an Access Router (AR) and Mobile Node (MN) therefor. The method include the steps of a first AR, to which a MN is connected, receiving an L3 handover initiation message, including a Media Access Control (MAC) address of the MN and the ID of a target Base Station (BS); the first AR creating a Local Care-of Address (LCoA) based on the MAC address of the MN and the ID of the target BS, and performing Binding Update (BU) on a Mobility Anchor Point (MAP) using the created LCoA; when an L2 handover completion message is received from the target BS of the MN, a second AR creating a second LCoA and transmitting the second LCoA to the MN; and the MN receiving the second LCoA from the second AR and configuring the received second LCoA as its own LCoA.

4 Claims, 8 Drawing Sheets

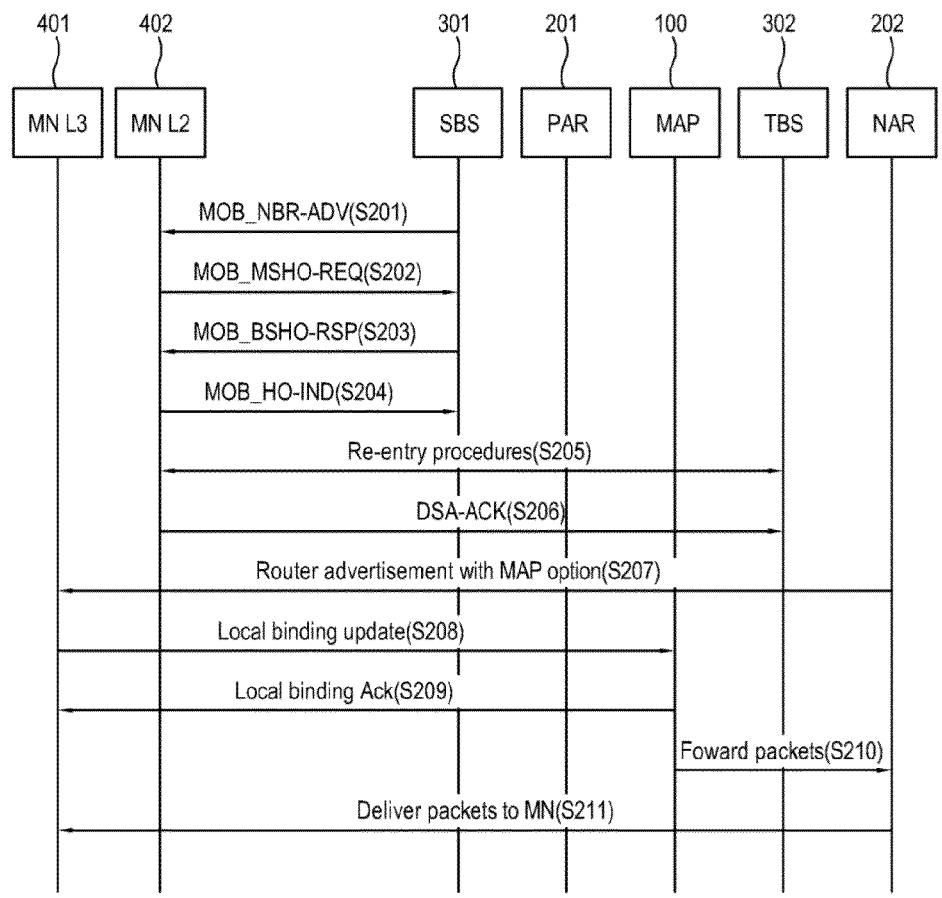

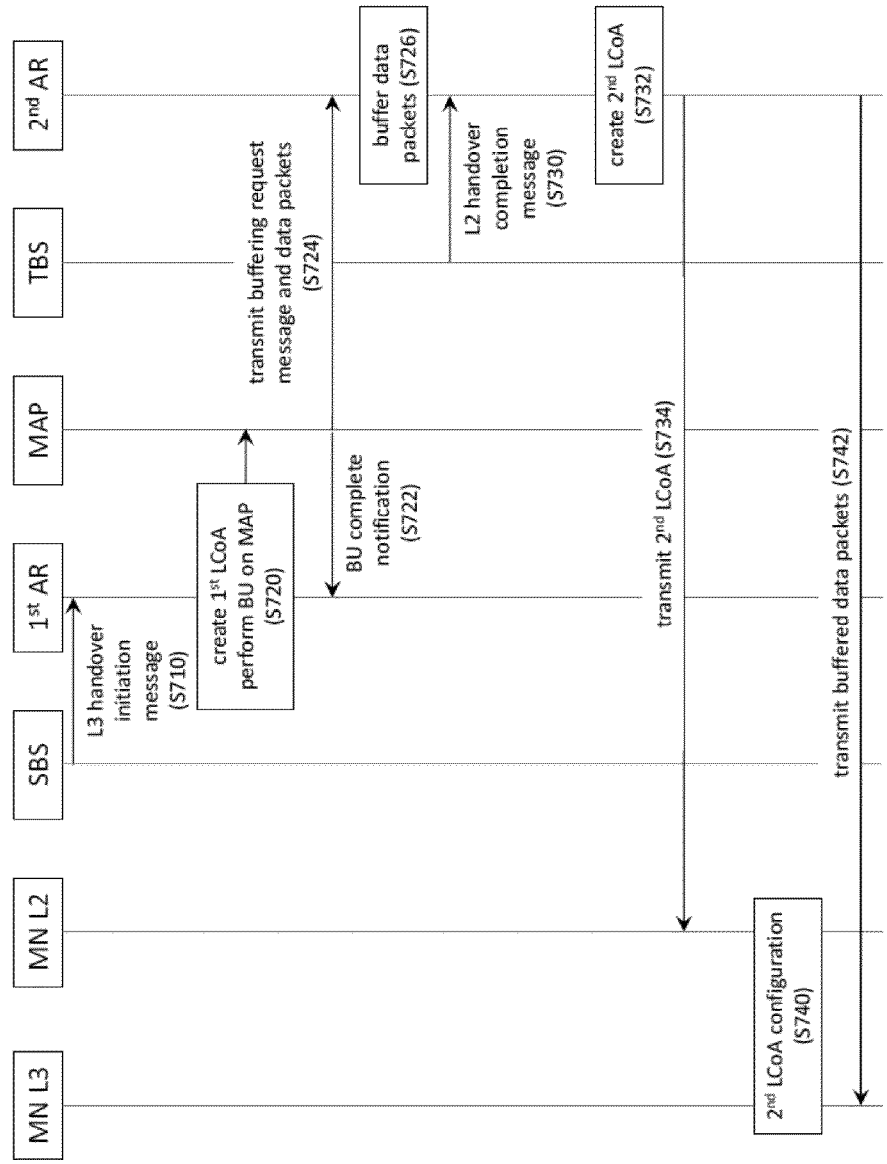

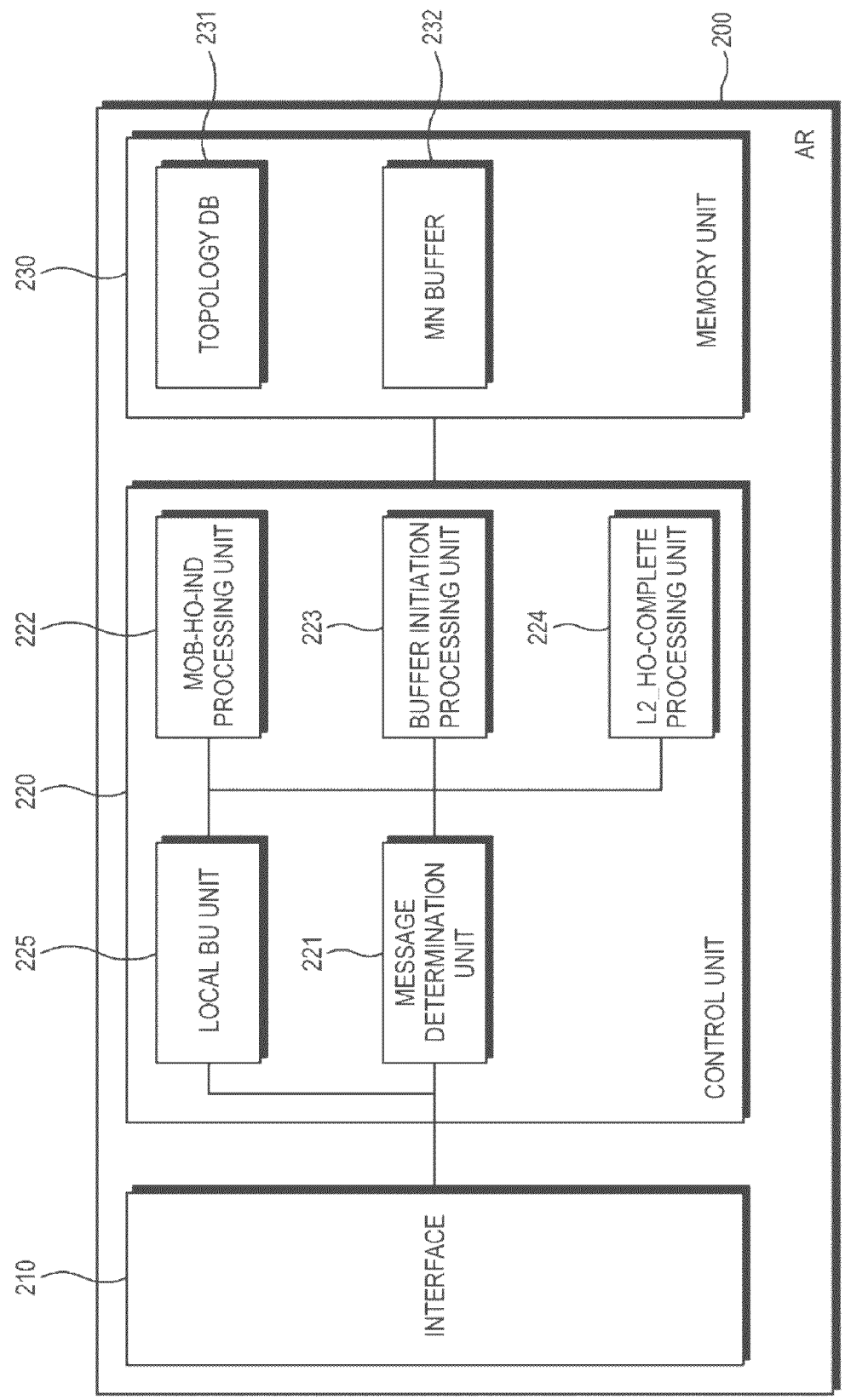

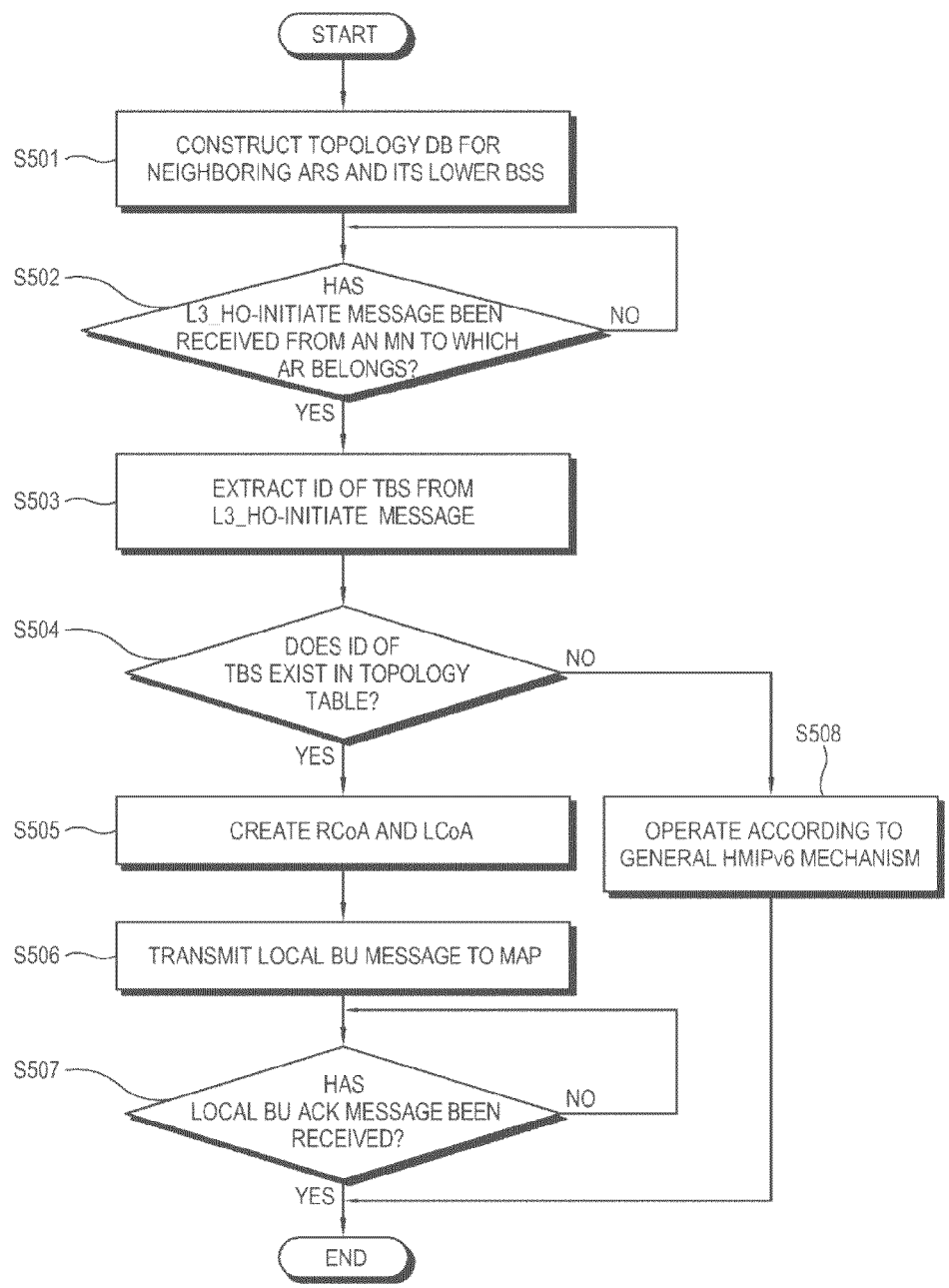

METHOD OF CONTROLLING HMIPV6 NETWORK-BASED HANDOVER, AND ACCESS ROUTER AND MOBILE NODE THEREFOR

BACKGROUND OF THE INVENTION

1. Field of Invention

The present invention relates generally to a method of controlling Hierarchical Mobile IPv6 (HMIPv6) network-based handover, and an Access Router (AR) and Mobile Node (MN) therefor, and, more particularly, to a handover method based on a network using HMIPv6 in an IEEE 802.16e network.

2. Description of Related Art

With the continuous development and diversification of wireless access technology, users desire to receive network service even in a mobile environment. In order to provide seamless service, a handover technology in the network layer is required. Mobile IPv6 (MIPv6) is a protocol that is proposed by the Internet Engineering Task Force (IETF). The protocol provides a mobile management function in the network layer.

In MIPv6, a handover process can be divided into processes, such as a movement detection process, a Care-of-Address (CoA) configuration process and a Binding Update (BU) process. While handover is being performed through the processes, an MN is unable to transmit or receive data. This period of time is called handover delay time.

In order to reduce the handover delay time generated when a handover scheme proposed in the MIPv6 protocol is used, the IETF proposed Fast MIPv6 (FMIPv6) and HMIPv6, which are based on MIPv6.

Of them, HMIPv6 differs from general MIPv6 as follows. During the handover process of general MIPv6, an MN performs BU on a Home Agent (HA) and a Correspondent Node (CN).

HMIPv6 is configured such that an MN performs BU on a Mobility Anchor Point (MAP), unlike MIPv6. HMIPv6 can have an advantage in that it can reduce the handover delay time through this mechanism as compared with the general MIPv6. The operation of the general HMIPv6 is described below.

FIG. 1 is a diagram showing the configuration of a general HMIPv6 network.

As shown in FIG. 1, an HMIPv6 network may include an HA 10, a CN 20, a MAP 100, a plurality of ARs 201 and 202, a plurality of Base Stations (BSs) 300, and at least one MN 400.

The Previous Access Router (PAR) 201 of the ARs corresponds to an AR that has accessed a network layer before the MN 400 performs handover. The Next Access Router (NAR) 202 of the ARs corresponds to an AR that will access the network layer after the MN 400 performs handover.

The Serving Base Station (SBS) 301 of the BSs 300 corresponds to a BS which has accessed a data link layer before the MN 400 performs handover. The Target Base Station (TBS) 302 of the BSs 300 corresponds to a BS which will access the data link layer after the MN 400 performs handover.

Each of the HA 10 and the CN 20 maps the permanent IP address of the MN 400 to a CoA pertinent to the permanent IP address, and transmits packets to a network to which the MN 400 belongs.

A handover method in the HMIPv6 network including the elements is described below.

In the case where the MN 400 has moved and handover has to be performed, the MN 400 selectively performs two types of BU processes depending on the situation.

First, in the case where the MN 400 has moved between the domains of MAPs 100, the MN 400 performs global BU (or inter-MAP). Second, in the case where the MN 400 has moved within the domain of an MAP 100, the MN 400 performs local BU (intra-MAP).

In an HMIPv6 environment, the MN 400 has two types of CoAs which are called a Regional CoA (RCoA) and a Local CoA (LCoA). The RCoA is a temporary address commonly used within the domain of the MAP 100, and a process of notifying the MAP 100 and the CN 20 of the relationship between RCoAs corresponds to global BU. The LCoA corresponds to the same address as a CoA in the existing MIPv6. A process of notifying the MAP 100 of the relationship between the newly created LCoA and RCoA corresponds to the local BU.

If the MN 400 moves and enters the domain of a new MAP 100, the MN 400 reconfigures two types of RCoA and LCoA. Accordingly, the MN 400 performs both global BU and local BU.

However, in the case where the MN 400 performs handover within the domain of the MAP 100, the MN 400 performs a position registration procedure by performing a local BU process only on the MAP 100. Next, the MAP 100 operates like an HA in the domain that the MN 400 has accessed and performs position management of the MN 400. A method of the MN 400 performing handover within the domain of the MAP 100 is described in more detail.

FIG. 2 is a diagram showing a handover procedure within the domain of a MAP in HMIPv6 over an IEEE 802.16e network.

Referring to FIG. 2, when the MN 400 moves, it terminates a connection to the SBS 301 to which the MN 400 is connected and attempts to set up a new connection to the TBS 302.

The data link layer 402, that is, the MN Layer 2, of the MN 400 performs a handover process from the SBS 301 to the TBS 302 in the data link layer, through processes from a MOB_NBR-ADV transmission process 5201 to a DSA-ACK transmission process S206 in accordance with the IEEE 802.16e standard. This handover in the data link layer is also referred to as Layer 2 or L2 handover.

After the handover in the data link layer or L2 handover is completed, the network layer 401, that is, the MN Layer 3, of the MN 400 starts handover in the network layer by receiving a router advertisement message at step S207, including information of MAP 100, from the NAR 202. The handover in the network layer is also referred to as Layer 3 or L3 handover.

The network layer of the MN can acquire the global IP address and network prefix of the MAP 100 from the router advertisement message received at step S207. The MN 400 can determine whether it performs handover within the domain of a MAP 100 or performs handover between the domains of MAPs 100, or handover in the network layer is not necessary based on the global IP address and network prefix of the MAP 100.

In the case where handover in the network layer is not necessary, the MN 400 has only to maintain a current LCoA and RCoA configuration, so that a detailed description thereof is omitted here.

The L3 layer 401 of the MN 400 creates an LCoA based on the network prefix of the NAR 202 which can be acquired from the router advertisement message received at step S207.

In the case where global BU is necessary, the MN 400 creates an RCoA based on the network prefix of the MAP 100. Here, an IPv6 stateless address auto configuration may be used.

In FIG. 2, the case where global BU is not necessary and only local BU is necessary is assumed. This assumption corresponds to the case where the MN 400 performs handover within the domain of the MAP 100. In this case, the network layer 401 of the MN 400 performs only local BU along with the MAP 100 at step S208.

After local BU is completed, the MAP 100 creates a tunnel between the network layer 401 of the MN 400 and the MAP 100. The MAP 100 then transmits packets, having the MN 400 as a destination, to the NAR 202 to which the MN 400 will belong through the tunnel using a binding cache at step S210. Finally, the NAR 202 transmits the packets, which have been received through the tunnel, to the MN 400 at step S211.

The time taken for the above-described handover (that is, the handover delay time) basically includes movement detection time, CoA configuration time, and BU time.

In general HMIPv6, in the case where handover is generated within the domain of the MAP 100, the time taken for the BU time, which belongs to the entire handover delay time, can be reduced, thereby reducing the entire handover delay time.

However, in general HMIPv6, handover in the L3 layer 401 of the MN 400 starts after handover in the L2 layer 402 has been terminated. In other words, handover in the network layer starts with the process 5207 of receiving the router advertisement message from a new AR (NAR). The network layer 401 of the MN 400 performs movement detection through the router advertisement message.

In this case, the time taken for the MN 400 to wait for the reception of the router advertisement message varies depending on a router advertisement message time interval set in the AR. Accordingly, after handover in the data link layer has been completed, the MN 400 may have to wait for a long time depending on the setting of the AR.

If handover delay is long as described above, the MN 400 inevitably experiences great packet loss. Although packet lossless is guaranteed in an upper layer using a mechanism, such as the Transmission Control Protocol (TCP), there is a problem in that a long handover delay time may lead to a low packet throughput in the MN 400 because of the characteristics of TCP.

SUMMARY OF THE INVENTION

Accordingly, the present invention has been made keeping in mind the above problems occurring in the prior art, and an object of the present invention is to provide a method of controlling handover, which overlappingly performs handovers in the data link layer and the network layer in order to reduce packet loss and improve the packet throughput by reducing the handover delay time in HMIPv6, and an AR and MN therefor.

In order to achieve the above object, according to an aspect of the present invention, there is provided a method of controlling handover in an HMIPv6-based network, including the steps of: (a) a first Access Router (AR), to which a Mobile Node (MN) is being connected, receiving an L3 handover initiation message, including a Media Access Control (MAC) address of the MN and an identifier (ID) of a target Base Station (BS); (b) the first AR creating a first Local Care-of Address (LCoA) based on the MAC address of the MN and the ID of the target BS, and performing Binding Update (BU) on a Mobility Anchor Point (MAP) using the first LCoA; (c) when an L2 handover completion message is received from the target BS of the MN, a second AR creating a second LCoA and transmitting the second LCoA to the MN; and (d) the MN receiving the second LCoA from the second AR and configuring the second LCoA as its own LCoA.

The method may further include the steps of: (e) after the BU has been performed at the step (b), the MAP transmitting a buffering request message, including the LCoA on the BU has been performed, to the second AR, receiving packets having the LCoA as a destination, and transmitting the packets to the second AR; and (f) the second AR, which has received the buffering request message, buffering the packets having the LCoA, included in the buffering request message, as a destination.

The method may further include the step (g) of, after the second LCoA of the MN at the step (d) has been configured, the second AR transmitting the packets buffered at the step (f) to the MN.

The method may further include the step (h) of, after the BU has been performed at the step (b), the MAP notifying the first AR of the completion of the BU.

In this case, the L2 handover completion message at the step (c) may include the MAC address of the MN.

Meanwhile, at the step (c), the second AR may create the second LCoA of the MN based on its own prefix information and the MAC address of the MN included in the L2 handover completion message.

At the step (c), the second AR may insert the generated second LCoA into an L3 handover completion notification message and transmit the L3 handover completion notification message to the MN.

The step (d) may inlcude the steps of a Layer 2 processing unit of the MN determining whether the L3 handover completion notification message has been received; if, as a result of the determination, the L3 handover completion notification message is determined to have been received, the Layer 2 processing unit extracting the second LCoA from the L3 handover completion notification message and transmitting the extracted LCoA to a Layer 3 processing unit; and the Layer 3 processing unit configuring the second LCoA as its own LCoA.

Finally, the method may further include, after the step (a), the steps of: (i) the first AR determining whether the ID of the target BS, included in the L3 handover initiation message, exists in its own topology table; and (j) if, as a result of the determination at the step (i), the ID of the target BS is determined to exist in the topology table, the first AR performing the steps subsequent to the step (b), and if, as a result of the determination at the step (i), the ID of the target BS is determined not to exist in the topology table, the AR instructing the MN to directly perform BU along with the MAP.

According to another aspect of the present invention, there is provided an AR, including at least one interface for performing data transmission/reception; and a control unit for extracting an MAC address of an MN and an ID of a target BS from an L3 handover initiation message received via the interface, creating an LCoA of the MN based on the MAC address and the ID, and performing BU along with a MAP.

The AR may further include a topology database (DB) for managing information about neighboring ARs and BSs managed by the neighboring ARs.

If the ID of the target BS extracted from the L3 handover initiation message exists in the topology DB, the control unit may create the LCoA of the MN based on the ID of the target BS and perform the BU along with an MAP.

If the ID of the target BS extracted from the L3 handover initiation message exists in the topology DB, the control unit may instruct the MN to directly perform the BU along with the MAP.

When a buffering request message is received from the MAP, the control unit may store packets each having an address, included in the buffering request message, as a destination in a storage device.

When an L2 handover completion message is received from the target BS of the MN, the control unit may create the LCoA of the MN and transmit the created LCoA to the MN.

The control unit may create the LCoA of the MN based on the MAC address of the MN, included in the L2 handover completion message, and its own prefix information.

The control unit may insert the generated LCoA into an L3 handover completion message and transmit the L3 handover completion message to the MN.

According to another aspect of the present invention, there is provided an MN, including a Radio Frequency (RF) communication unit for performing data communication using a radio signal; and a control unit for, when performance of L2 and L3 handovers is desired, transmitting a handover initiation message to an AR to which the control unit belongs and performing the L2 handover, and, when an L3 handover completion message is received via the RF communication unit, configuring an LCoA, included in the L3 handover completion message, as its own LCoA.

The control unit may include an L2 processing unit for processing messages of a data link layer and, when the L3 handover completion message is received, extracting the LCoA from the L3 handover completion message; and an L3 processing unit for processing messages of a network layer and configuring the LCoA, extracted by the L2 processing unit, as an LCoA of the MN.

The control unit may further include a local BU unit for directly performing BU along with a MAP at the request of an AR to which the MN is connected.

BRIEF DESCRIPTION OF THE DRAWINGS

The above and other objects, features and advantages of present invention will be more clearly understood from the following detailed description taken in conjunction with the accompanying drawings, in which:

FIG. 2 is a diagram showing a handover procedure within the domain of a MAP in HMIPv6 over an IEEE 802.16e network;

FIG. 3B is a diagram showing an HMIPv6 network-based handover method according to an alternative embodiment;

FIG. 4 is a diagram showing the block construction of an AR according to another embodiment of the present invention;

FIG. 5 is a diagram showing a BU process that the AR of FIG. 4 performs as a PAR;

DESCRIPTION OF THE PREFERRED EMBODIMENTS

A method of controlling HMIPv6 network-based handover, and an AR and MN therefor according to the present invention are described below in detail with reference to the accompanying drawings.

Figure 1:
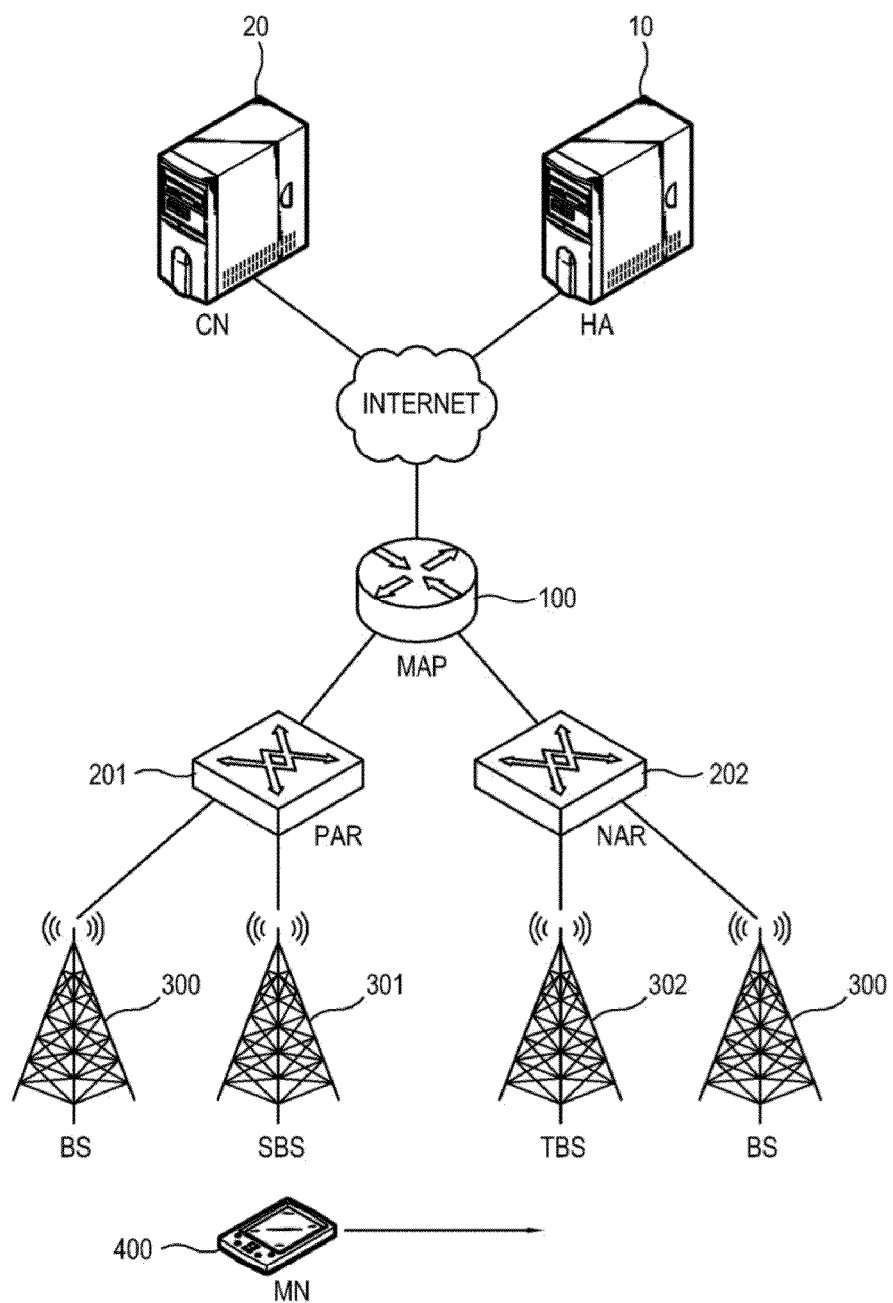
FIG. 1 is a diagram showing the configuration of a general HMIPv6 network.
Figure 3A:
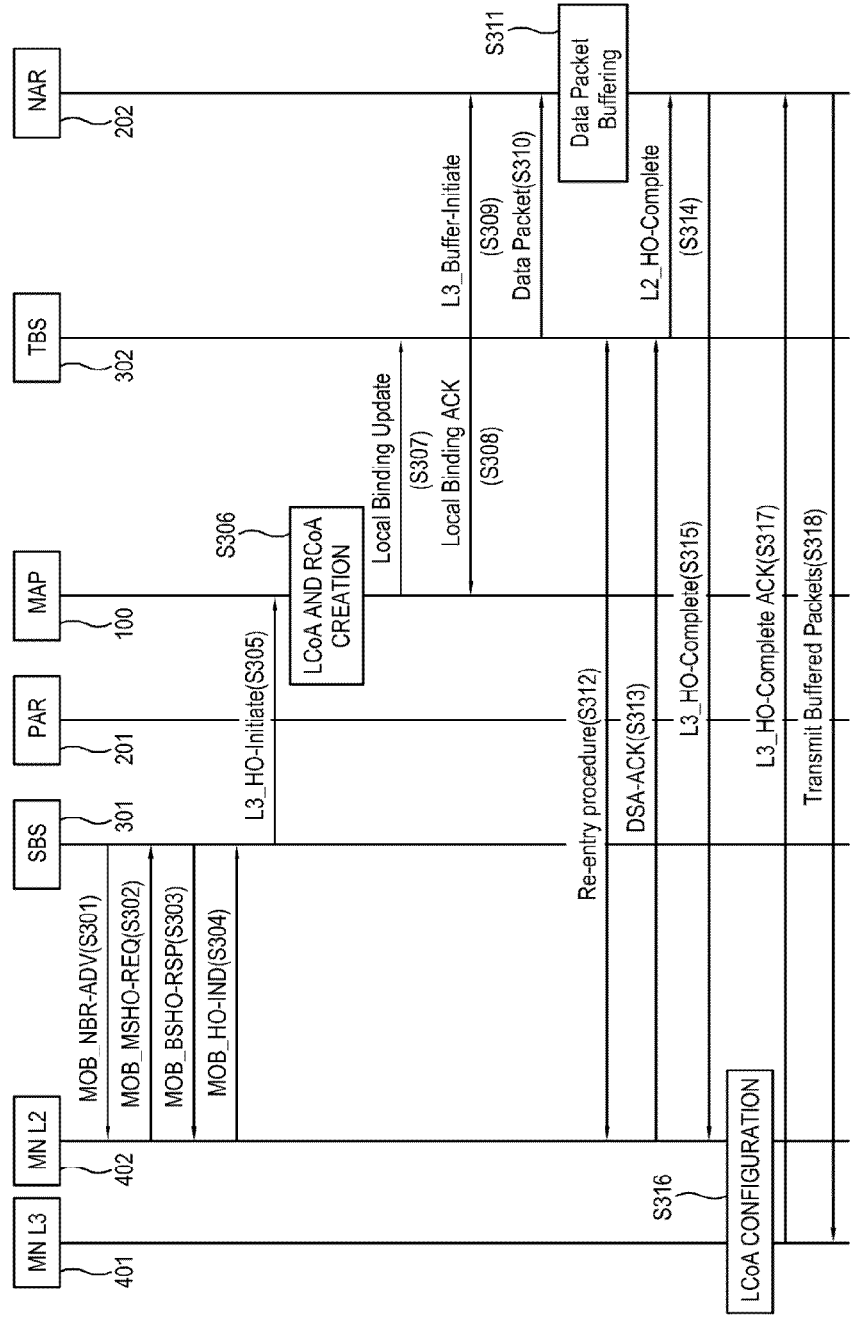
FIG. 3A is a diagram showing an HMIPv6 network-based handover method according to an embodiment of the present invention.

FIG. 3A is a diagram showing the HMIPv6 network-based handover method according to an embodiment of the present invention.

Referring to FIG. 3A, a system relating to handover according to the present invention includes the L3 layer 401 and L2 layer 402 of an MN 400, an SBS 301, a PAR 201, a MAP 100, a TBS 302, and an NAR 202.

The L3 layer 401 of the MN 400 is the network layer of the MN 400, and is configured to communicate with the PAR 201 or the NAR 202. The L2 layer 402 of the MN 400 is the data link layer of the MN 400, and is configured to communicate with the SBS 301 or the TBS 302.

As described above, the SBS 301 is a BS to which the MN 400 has already been connected before the MN 400 performs handover in the data link layer. The TBS 302 is a BS to which the MN 400 will be connected after the MN 400 performs handover in the data link layer.

The PAR 201 is an AR to which the MN 400 is connected in the network layer before handover is performed in the network layer. In a similar way, the NAR 202 is an AR to which the MN 400 will be connected in the network layer after handover has been performed in the network layer.

The MAP 100 functions as a local HA for the L3 layer 401 of the MN 400.

In the present invention, each of the ARs 201 and 202 has information about neighboring ARs, which belong to the same domain. Each of the ARs 201 and 202 also stores information about the IDs of BSs, which belong to neighboring ARs. A handover process according to the embodiment of the present invention is described below in more detail.

When the MN 400 moves, the L2 layer 402 of the MN 400 performs handover in the data link layer. The L2 layer 402 of the MN 400 exchanges messages, such as MOB_NBR-ADV, MOB_MSHO-REQ and MOB_BSHO-RSP, with the SBS 301 at steps S301 to S303.

The L2 layer 402 of the MN 400 determines the TBS 302 to be a final handover subject based on the exchanged messages. Next, the L2 layer 402 of the MN 400 transmits a MOB_HO-IND message, including the Base Station ID (BSID) of the TBS 302, to the SBS 301 at step S304. The SBS 301 receives the MOB_HO-IND message from the L2 layer 402 and extracts the BSID of the TBS 302 and the Media Access Control (MAC) address of the MN 400 from the MOB_HO-IND message. The SBS 301 creates an L3_HO-Initiate message including the BSID of the TBS 302 and the MAC address of the MN 400, and transmits the created L3_HO-Initiate message to the MAP 100 connected thereto at step S305. Here, the L3_HO-Initiate message corresponds to a message initiating L3 handover.

As described above, each of the ARs 201 and 20 stores information about neighboring ARs belonging to the same domain, and information about BSs belonging to neighboring ARs. Accordingly, the PAR 201 can determine the AR 201 or 202 to which the TBS 302 belongs based on the BSID of the TBS 302 included in the L3_HO-Initiate message.

If, as a result of the determination, the BSID of the TBS 302 does not exist in a database (DB) managed by the PAR 201, it corresponds to the case where the MN 400 has to perform handover between the domains of the MAP 100 or the case where handover in the network layer is not necessary. In this case, the PAR 201 instructs the L3 layer 401 of the MN 400 to perform a handover process between the domains of the MAP 100 in general HMIPv6 or to omit a network layer handover process.

However, if, as a result of the determination, the TBS 302 is determined to belong to the NAR 202, the PAR 201 performs a handover process within the domain of the MAP 100 in HMIPv6 instead of the MN 400.

That is, the MAP 100 creates an LCoA to be used by the MN 400 based on the network prefix of the NAR 202, which is found based on the BSID of the TBS 302, and the MAC address of the MN 400, which is included in the L3_HO-Initiate message, at step S306.

As the router advertisement message may include information about the MAP 100 depending on the HMIPv6 specification, each of the ARs 201 and 202 also stores information about the MAP 100 placed at the upper position in the network architecture. Accordingly, the MAP 100 may also create an RCoA for the MN 400 by combining the network prefix of the MAP 100 and the MAC address of the MN 400 at step S306.

The PAR 201 then performs a local BU process along with the MAP 100 using the created LCoA and RCoA instead of the MN 400 at step S307. The MAP 100 updates a binding cache for the MN 400 to a new LCoA by performing the local BU along with the PAR 201.

In response to local BU ACK from the NAR 202 at step S308, the MAP 100 creates an L3_Buffer-Initiate message (a buffering request message) and transmits it to the NAR 202 at step S309. The MAP 100 then tunnels packets, received at the RCoA, to the new LCoA at step S310.

The L3_Buffer-Initiate message includes the LCoA of the MN. The NAR 202 that has received the L3_Buffer-Initiate message buffers packets having the corresponding LCoA as a target IP address at step S311.

Meanwhile, the data link layer L2 of the MN 400 performs handover in the data link layer simultaneously when the handover in the network layer L3 of the MN 400 has been performed by the ARs 201 and 202 and the BSs 301 and 302. The L2 layer 402 of the MN 400 performs the handover in the data link layer of the MN 400 through a re-entry procedure (S312) along with the TBS 302. Finally, the L2 layer 402 of the MN 400 transmits a DSA-ACK message to the TBS 302, so the handover in the data link layer is completed at step S313.

When the DSA-ACK message is received at step S313, the TBS 302 transmits an L2_HO-Complete message (an L2 handover completion message), including the MAC address of the MN 400, to the NAR 202 connected thereto, thereby providing notification that the handover in the data link layer of the MN 400 has been completed at step S314. The NAR 202 creates the second LCoA of the MN 400 based on the MAC address of the MN 400 included in the received L2_HO-Complete message and transmits an L3_HO-Complete message including the created second LCoA, to the MN 400 at step S315.

The L2 layer 402 of the MN 400 extracts the LCoA from the received L3_HO-Complete message, and transmits the extracted LCoA to the L3 layer 401. The L3 layer 401 of the MN 400 configures the LCoA included in the L3_HO-Complete message at step S316, and performs subsequent communication using the LCoA.

The L3 layer 401 of the MN 400 transmits an L3_HO-Complete ACK message to the NAR 202 at step S317. When the L3_HO-Complete ACK message is received, the NAR 202 transmits the packets buffered for the MN 400 to the MN 400, thereby completing the entire handover process at step S318.

FIG. 3B is a diagram showing an HMIPv6 network-based handover method according to an alternative embodiment. Specifically, FIG. 3B illustrates an alternative example of a method of controlling handover in a HMIPv6-based network.

In this example embodiment, a first AR, to which an MN is connected, receives an L3 handover initiation message. The L3 handover initiation message includes an MAC address of the MN and an ID of a target BS. See S710 in FIG. 3B.

The first AR creates a first LCoA based on the MAC address of the MN and the ID of the target BS. The first AR also performs a BU on an MAP using the first LCoA. See S720 in FIG. 3B.

A second AR receives an L2 handover completion message from the target BS of the MN. See S730 in FIG. 3B. The L2 handover completion message comprises the MAC address of the MN. The second AR also creates a second LCoA and transmits the second LCoA to the MN. See S732 and S734 in FIG. 3B.

The MN receives the second LCoA from the second AR and configures the second LCoA as its own LCoA. See S740 in FIG. 3B.

After the BU is performed in S720, the MAP notifies the first AR that the BU is complete. See S722 in FIG. 3B. The MAP also transmits a buffering request message that includes the first LCoA to the second AR, receives data packets having the first LCoA as a destination, and transmits the data packets to the second AR. See S724 in FIG. 3B.

The second AR, after receiving the buffering request message and data packets having the first LCoA as a destination, buffers the data packets. See S726 in FIG. 3B.

After the second LCoA is configured in S740, the second AR transmits the buffered data packets to the MN. See S742 in FIG. 3B.

FIG. 4 is a diagram showing the block construction of the AR according to another embodiment of the present invention.

The AR 200 for performing the handover processes of FIGS. 3A and 3B may include an interface 210, a control unit 220, and a memory unit 230. The control unit 220 may include a message determination unit 221, an MOB-HO-IND processing unit 222, a Buffer-Initiate processing unit 223, and an L2_HO-Complete processing unit 224.

The interface 210 corresponds to a port for performing data communication with the AR 200, the BS 300, or the MN 400.

The memory unit 230 includes a topology DB 231 and an MN buffer 232. The topology DB 231 corresponds to a DB in which information about neighboring ARs belonging to the same domain as the AR 200 and information about BSs below the neighboring ARs are stored. The MN buffer 232 corresponds to storage space for buffering packets which are received at a specific LCoA from the MAP.

The control unit 220 is responsible for the overall control of the AR 200. In the control unit 200 of FIG. 4, a detailed construction responsible for a general control function is omitted and only the block construction for performing the handover processes of FIGS. 3A and 3B are shown.

The message determination unit 221 of the control unit 200 determines the type of message received via the interface 210, and transmits the message to an element for processing the message depending on the type of message. For example, when an MOB-HO-IND message is received, the message determination unit 221 transmits the message to the MOB-HO-IND processing unit 222. In contrast, when a Buffer-Initiate message is received, the message determination unit 221 transmits the message to the Buffer-Initiate processing unit 223.

The MOB-HO-IND processing unit 222 extracts the BSID of the TBS 302 and the MAC address of the MN 400 from the received MOB-HO-IND message. The MOB-HO-IND processing unit 222 then determines whether the BSID of the TBS 302 exists in the topology DB 231 of the memory unit 230.

If, as a result of the determination, the BSID of the TBS 302 is determined to exist in the topology DB 231 of the memory unit 230, the MOB-HO-IND processing unit 222 transmits the BSID of the TBS 302 and the MAC address of the MN 400 to the local BU unit 225. The MOB-HO-IND processing unit 222 controls the local BU unit 225 so that the local BU unit 225 performs local BU along with the MAP 100.

The Buffer-Initiate processing unit 223 operates in response to the L3_Buffer-Initiate message received from the MAP 100. When the L3_Buffer-Initiate message is received, the Buffer-Initiate processing unit 223 extracts the LCoA of the MN 400 from the L3_Buffer-Initiate message. The Buffer-Initiate processing unit 223 then configures packets transmitted to the LCoA so that the packets are buffered in the MN buffer 232 of the memory unit 230.

After the handover in the data link layer between the MN 400 and the TBS 302 is completed, the L2_HO-Complete processing unit 224 processes the L2_HO-Complete message received from the TBS 302. The L2_HO-Complete processing unit 224 extracts the MAC address of the MN 400 from the L2_HO-Complete message. Next, the L2_HO-Complete processing unit 224 creates an LCoA to be used by the MN 400 based on network prefix information of the AR 200 and the MAC address of the MN 400, and transmits an L3_HO-Complete message including the created LCoA to the MN 400.

FIG. 5 is a diagram showing a BU process that the AR of FIG. 4 performs as the PAR.

First, the AR stores information about neighboring ARs belonging to the same domain as the AR and information about lower BSs belonging to the neighboring ARs. A DB in which the pieces of information are stored corresponds to the topology DB at step S501.

An MN performs a handover process in the data link layer along with an SBS, and transmits the resulting MOB_HO-IND message to the SBS. When the MOB_HO-IND message is received, the SBS transmits an L3_HO-Complete message, including the MAC address of the MN and the BSID of a TBS, to the AR (that is, the PAR).

The AR, which is the PAR, determines whether an L3_HO-Initiate message has been received from the lower BSs managed by it at step S502. If, as a result of the determination at step S502, the L3_HO-Initiate message is determined to have been received, the PAR extracts the BSID of the TBS from the L3_HO-Initiate message at step S503.

Thereafter, the PAR determines whether the extracted BSID of the TBS exists in the topology DB at step S504. If, as a result of the determination at step S504, the extracted BSID of the TBS is determined not to exist in the topology DB, the PAR instructs the MN to perform handover using a general HMIPv6 mechanism at step S508.

Meanwhile, if, as a result of the determination at step S504, the extracted BSID of the TBS is determined to exist in the topology DB, the PAR creates an RCoA and an LCoA based on the MAC address of the MN, the BSID of the TBS, and network prefix information of a MAP which are included in the L3_HO-Initiate message at step S505.

Thereafter, the PAR transmits a local BU message to the MAP based on the created RCoA and LCoA so that position registration of the MN, that is, local BU, is performed at step S506. The AR, which is the PAR, determines whether a local BU ACK message has been received from the MAP at step S507.

If, as a result of the determination at step S507, the local BU ACK message is determined not to have been received from the MAP, the AR, which is the PAR, may continue to wait for the reception of the local BU ACK message ('No' at step S507). If the local BU ACK message is not received from the MAP for a specific period of time, the AR may consider performing an operation for retransmitting the local BU message to the MAP.

If, as a result of the determination at step S507, the local BU ACK message is determined to have been received from the MAP, the AR, which is the PAR, terminates the operation ('Yes' at step S507).

Figure 6:
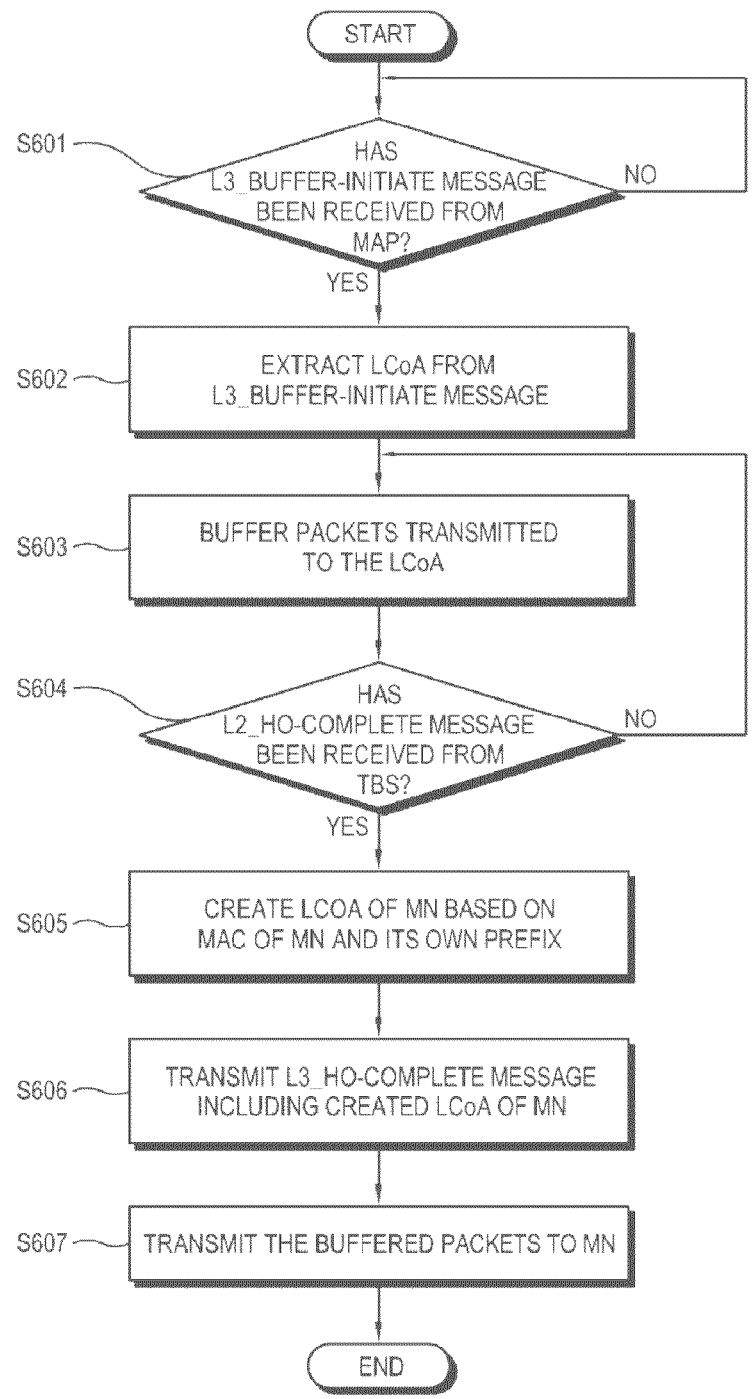
FIG. 6 is a diagram showing a buffering operation that the AR of FIG. 4 performs as an NAR.

FIG. 6 is a diagram showing a buffering operation that the AR of FIG. 4 performs as the NAR.

A MAP performs local BU using the local BU message received at step S506 of FIG. 5. After the local BU has been performed, the MAP transmits an L3_Buffer-Initiate message to the NAR. In response thereto, the AR, which is the NAR, determines whether the L3_Buffer-Initiate message has been received from the MAP at step S601.

If, as a result of the determination at step S601, the L3_Buffer-Initiate message is determined not to have been received from the MAP ('No' at step S601), the AR does not perform any operation and returns to step S601. However, if, as a result of the determination at step S601, the L3_Buffer-Initiate message is determined to have been received from the MAP ('Yes' at step S601), the AR, which is the NAR, extracts the second LCoA of the MN from the L3_Buffer-Initiate message at step S602. Next, the AR, which is the NAR, performs an operation of buffering packets, which are received at the extracted second LCoA, in the memory unit at step S603.

Meanwhile, while the packets are buffered, the MN performs handover in the data link layer along with a TBS. After the handover in the data link layer has been completed, the TBS transmits the L2_HO-Complete message, including the MAC address of the MN which has performed the handover, to the NAR (S314 of FIG. 3A or 5730 of FIG. 3B).

In response thereto, the AR, which is the NAR, determines whether the L2_HO-Complete message has been received from a BS, such as a TBS at step S604. If, as a result of the determination at step S604, the L2_HO-Complete message is determined not to have been received ('No' at step S604), the AR, which is the NAR, continues to perform the buffering operation at step S603.

However, if, as a result of the determination at step S604, the L2_HO-Complete message is determined to have been received ('Yes' at step S604), the AR, which is the NAR, creates a second LCoA to be used by the MN in the L3 layer based on the MAC address of the MN, included in the L2_HO-Complete message, and its own network prefix information at step S605.

Thereafter, the AR, which is the NAR, transmits an L3_HO-Complete message, including the generated second LCoA of the MN, to the MN at step S606. When the MN transmits an ACK message providing notification of the reception of the L3_HO-Complete message, the NAR transmits the packets, which have been buffered at step S603, to the MN at step S607.

Figure 7:
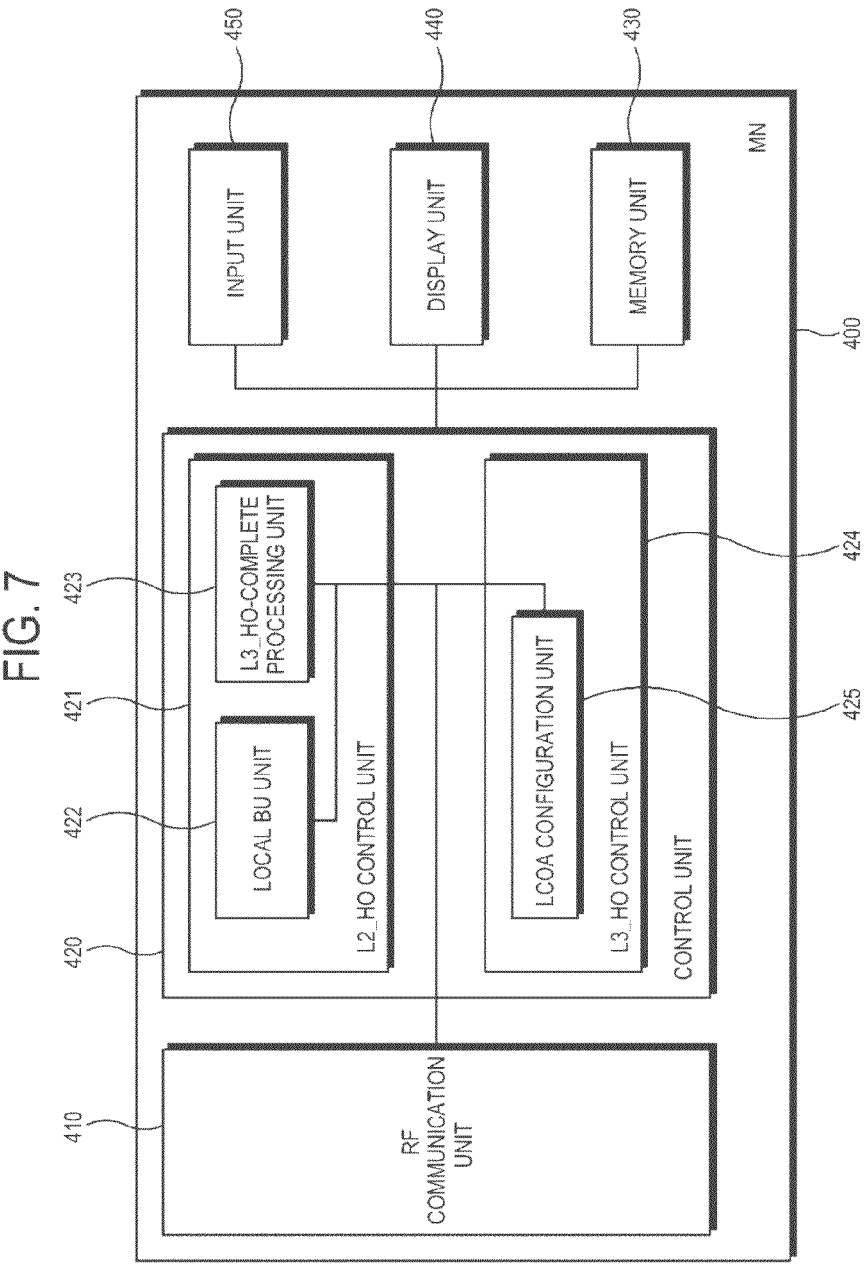
FIG. 7 is a diagram showing the block construction of the MN according to still another embodiment of the present invention.

FIG. 7 is a diagram showing the block construction of the MN according to still another embodiment of the present invention.

The MN 400 for performing the handover processes of FIGS. 3A and 3B may include a Radio Frequency (RF) communication unit 410, a control unit 420, a memory unit 430, a display unit 440, and an input unit 450. From among these, the display unit 440 and the input unit 450 are similar to those of an existing MN, so that detailed descriptions thereof are omitted here.

If the performance of L3 handover is desired, the control unit 420 transmits the MOB_HO-IND message (step S304) to the BS (SBS) to which the control unit 420 is connected, and continues to perform L2 handover.

If an L3 handover completion message, that is, the L3_HO-Complete message at step S315, is received from the NAR 202 to which handover will be performed by the MN 400, the control unit 420 functions to configure a second LCoA, included in the L3_HO-Complete message, as its own LCoA.

For this handover process, the control unit 420 may include an L2_HO control unit 421 and an L3_HO control unit 424. In the case where the MN 400 has moved and therefore handover is determined to be necessary, the L2_HO control unit 421 performs the handover in the data link layer along with the SBS. The L2_HO control unit 421 can acquire the BSID of a TBS to which the handover will be performed by the control unit 421 through this handover process in the data link layer.

The L2_HO control unit 421 creates an MOB_HO-IND message. In particular, the MOB_HO-IND processing unit 422 of the L2_HO control unit 421 creates the MOB_HO-IND message, including the MAC address of the MN 400 and the BSID of the TBS to which handover will be performed by the MN 400, and transmits the created MOB_HO-IND message to the SBS 301 via the RF communication unit 410.

Meanwhile, the L3_HO-Complete processing unit 423 of the L2_HO control unit 421 processes the L3 handover completion message (that is, the L3_HO-Complete message) received from the NAR 202. The L3_HO-Complete processing unit 423 extracts the second LCoA from the L3_HO-Complete message, and transmits the extracted second LCoA to the LCoA configuration unit 425 of the L3_HO control unit 424.

The LCoA configuration unit 425 of the L3_HO control unit 424, which has received the second LCoA from the L3_HO-Complete processing unit 423, configures the LCoA of the MN 400 as the second LCoA received from the L3_HO-Complete processing unit 423. After the LCoA is configured, the L3_HO-Complete processing unit 423 can transmit an L3_HO-Complete ACK message to the NAR 202 and request buffered packets.

As described above, according to the present invention, in an IEEE 802.16e-based HMIPv6 network, an MAP, an AR and a BS perform handover in cooperation with each other, instead of an MN. In order to minimize packet loss generated during the handover process, the AR uses a buffer.

Consequently, since the handover in the data link layer and the handover in the network layer are performed at the same time, the overall handover delay time can be reduced. Packet loss generated while handover is performed can be minimized and the packet throughput can be improved.

Although the embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A method of controlling handover in a Hierarchical Mobile IPv6 (HMIPv6)-based network, comprising:
   (a) a first Access Router (AR), to which a Mobile Node (MN) is connected, receiving an L3 handover initiation message that includes a Media Access Control (MAC) address of the MN and an identifier (ID) of a target Base Station (BS);
   (b) the first AR creating a first Local Care-of Address (LCoA) based on the MAC address of the MN and the ID of the target BS, and performing a Binding Update (BU) on a Mobility Anchor Point (MAP) using the first LCoA;
   (c) a second AR (1) receiving an L2 handover completion message from the target BS of the MN, (2) creating a second LCoA, and (3) transmitting the second LCoA to the MN; and
   (d) the MN receiving the second LCoA from the second AR and configuring the second LCoA as its own LCoA;
   wherein: after the BU is performed in (b), the MAP (1) notifies the first AR that the BU is complete, (2) transmits a buffering request message that includes the first LCoA to the second AR, (3) receives data packets having the first LCoA as a destination, and (4) transmits the data packets to the second AR,
   the second AR, after receiving the buffering request message and data packets having the first LCoA as a destination, buffers the data packets,
   after the second LCoA is configured in (d), the second AR transmits the buffered data packets to the MN, and the L2 handover completion message comprises the MAC address the MN,
   the first LCoA is used for data transmission between the MAP and the second AR until the L2 handover completion message is received by the second AR, and
   the second LCoA is used for data transmission to the MN after the L2 handover completion message is received by the second AR; wherein the first LCoA is not the same as the second LCoA.

2. The method of claim 1, wherein the second AR creates the second LCoA based on (1) prefix information associated with the second AR and (2) the MAC address of the MN included in the L2 handover completion message.

3. The method of claim 2, wherein in (c) the second AR inserts the second LCoA into an L3 handover completion notification message and transmits the L3 handover completion notification message to the MN.

4. The method of claim 3, wherein (d) further comprises:
   a Layer 2 processing unit of the MN determining whether the L3 handover completion notification message has been received;
   the Layer 2 processing unit extracting the second LCoA from the L3 handover completion notification message and transmitting the second LCoA to a Layer 3 processing unit of the MN; and
   the Layer 3 processing unit configuring the second LCoA as its own LCoA.

\* \* \* \* \*